(12) United States Patent
Lingafelt et al.

(10) Patent No.: US 9,686,146 B2
(45) Date of Patent: *Jun. 20, 2017

(54) RECONFIGURING INTERRELATIONSHIPS BETWEEN COMPONENTS OF VIRTUAL COMPUTING NETWORKS

(71) Applicant: International Business Machines Corporation, Armonk, NY (US)

(72) Inventors: Charles S. Lingafelt, Durham, NC (US); James W. Murray, Durham, NC (US); James T. Swantek, Canton, GA (US); James S. Worley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,478

(22) Filed: Jan. 14, 2016

(65) Prior Publication Data

US 2016/0134487 A1 May 12, 2016

Related U.S. Application Data

(63) Continuation of application No. 13/406,847, filed on Feb. 28, 2012, now Pat. No. 9,270,523.

(51) Int. Cl.
*H04L 12/24* (2006.01)
*G06F 11/20* (2006.01)
(Continued)

(52) U.S. Cl.
CPC .......... *H04L 41/22* (2013.01); *G06F 11/2002* (2013.01); *H04L 12/28* (2013.01);
(Continued)

(58) Field of Classification Search
None
See application file for complete search history.

(56) References Cited

U.S. PATENT DOCUMENTS 5,619,636 A * 4/1997 Sweat ............... G06F 17/30017
345/473
5,655,081 A 8/1997 Bonnell et al.
(Continued)

FOREIGN PATENT DOCUMENTS

| CN | 101199165 A | 6/2008 |
|---|---|---|
| CN | 101217420 A | 7/2008 |
| CN | 101523805 A | 9/2009 |

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — Yolanda L Wilson
(74) *Attorney, Agent, or Firm* — William H. Hartwell; Hunter E. Webb; Keohane & D'Alessandro PLLC

(57) ABSTRACT

Embodiments of the present invention relate to an approach for reconfiguring interrelationships between components of virtual computing networks (e.g., a grid computing network, a local area network (LAN), a cloud computing network, etc.). In a typical embodiment, a set of information pertaining to a set of components associated with a virtual computing network is received in a computer memory medium or the like. Based on the set of information, a graphical representation (e.g., hierarchical tree) depicting the set of interrelationships between the set of components is generated. When a failure in the virtual computing network is detected, at least one of the set of interrelationships between (Continued)

the set of components is reconfigured based on the graphical representation and the set of rules to address the failure.

18 Claims, 16 Drawing Sheets

(51) Int. Cl.
    *H04L 12/28*     (2006.01)
    *H04L 12/46*     (2006.01)
    *H04L 12/751*    (2013.01)
    *H04L 12/703*    (2013.01)

(52) U.S. Cl.
    CPC ...... *H04L 12/4641* (2013.01); *H04L 41/0654* (2013.01); *H04L 41/12* (2013.01); *H04L 45/02* (2013.01); *H04L 45/28* (2013.01); *H04L 41/0668* (2013.01)

(56) References Cited

U.S. PATENT DOCUMENTS

| | | | |
|---|---|---|---|
| 5,751,965 A * | 5/1998 | Mayo | H04L 41/0213 709/224 |
| 5,862,391 A | 1/1999 | Salas et al. | |
| 5,926,463 A * | 7/1999 | Ahearn | H04L 41/024 370/254 |
| 7,237,138 B2 | 6/2007 | Greenwald et al. | |
| 7,277,931 B1 | 10/2007 | Booth et al. | |
| 7,574,496 B2 | 8/2009 | McCrory et al. | |
| 7,634,681 B2 * | 12/2009 | Takamoto | G06F 11/2028 714/15 |
| 7,639,632 B2 | 12/2009 | Sarkar et al. | |
| 7,752,024 B2 * | 7/2010 | Ball | H04L 41/12 703/1 |
| 7,885,207 B2 | 2/2011 | Sarkar et al. | |
| 8,560,671 B1 * | 10/2013 | Yahalom | H04L 67/1097 709/224 |
| 2003/0051021 A1 | 3/2003 | Hirschfeld et al. | |
| 2004/0155899 A1 * | 8/2004 | Conrad | H04L 43/0817 715/736 |
| 2006/0031312 A1 * | 2/2006 | Ellanti | H04L 41/046 709/206 |
| 2007/0047556 A1 | 3/2007 | Raahemi et al. | |
| 2009/0276771 A1 * | 11/2009 | Nickolov | G06F 9/4856 717/177 |
| 2010/0042670 A1 | 2/2010 | Kamalakantha et al. | |
| 2010/0125903 A1 | 5/2010 | Devarajan et al. | |
| 2010/0128432 A1 * | 5/2010 | Miller | H05K 7/20836 361/679.54 |
| 2010/0185961 A1 * | 7/2010 | Fisher | G06F 11/324 715/760 |
| 2011/0261828 A1 | 10/2011 | Smith | |
| 2012/0054624 A1 * | 3/2012 | Owens, Jr. | H04L 41/22 715/735 |
| 2012/0284628 A1 | 11/2012 | Wong et al. | |
| 2012/0317491 A1 * | 12/2012 | Wong | H04L 41/22 715/736 |
| 2013/0227338 A1 | 8/2013 | Lingafelt et al. | |
| 2013/0262604 A1 * | 10/2013 | Elzur | H04L 41/0816 709/206 |

OTHER PUBLICATIONS

Mell et al., "The NIST Definition of Cloud Computing", National Institute of Standards and Technology, Information Technology Laboratory, Version 15, Oct. 7, 2009, 2 pages.
Yolanda L. Wilson, USPTO Office Action, U.S. Appl. No. 13/406,847, Notification Date Dec. 19, 2013, 23 pages.
Yolanda L. Wilson, USPTO Final Office Action, U.S. Appl. No. 13/406,847, Notification Date Jun. 5, 2014, 9 pages.
Yolanda L Wilson, USPTO Office Action, U.S. Appl. No. 13/406,847, Notification Date Sep. 12, 2014, 12 pages.
Yolanda L Wilson, USPTO Final Office Action, U.S. Appl. No. 13/406,847, Notification Date Feb. 27, 2015, 15 pages.
Yolanda L Wilson, USPTO Notice of Allowance and Fee(s) Due, U.S. Appl. No. 13/406,847, Date Mailed Jun. 29, 2015, 5 pages.
Yolanda L Wilson, USPTO Notice of Allowance and Fee(s) Due, U.S. Appl. No. 13/406,847, Date Mailed Oct. 22, 2015, 9 pages.

* cited by examiner

| | | | | SERVER "1" ~132 | | | |
|---|---|---|---|---|---|---|---|
| | MEMORY | DISK SPACE | CPU 1 | CPU 2 | CPU N | NETWORK 1 | NETWORK 2 |
| VIRTUAL MACHINE 1 | 1G | 20G | 5% | 0% | | 0% | 100% |
| VIRTUAL MACHINE 2 | 1G | 40G | 5% | 10% | | 50% | 50% |
| VIRTUAL MACHINE 3 | 2G | 10G | 5% | 0% | | 50% | 50% |
| VIRTUAL MACHINE 4 | 2G | 10G | 5% | 0% | | 0% | 100% |
| VIRTUAL MACHINE 5 | 4G | 100G | 25% | 35% | | 50% | 50% |
| VIRTUAL MACHINE 6 | 1G | 10G | 10% | 0% | | 100% | 0% |
| VIRTUAL MACHINE 7 | 1G | 10G | 10% | 0% | | 100% | 0% |

134 — VIRTUAL SYSTEMS ON SERVER "1"

RECONFIGURING INTERRELATIONSHIPS BETWEEN COMPONENTS OF VIRTUAL COMPUTING NETWORKS

CROSS-REFERENCE TO RELATED APPLICATIONS

The present patent document is a continuation of U.S. patent application Ser. No. 13/406,847, filed Feb. 28, 2012, entitled "RECONFIGURING INTERRELATIONSHIPS BETWEEN COMPONENTS OF VIRTUAL COMPUTING NETWORKS", the disclosure of which is incorporated herein by reference.

TECHNICAL FIELD

In general, embodiments of the present invention relate to the reconfiguration of components of virtual computing networks. Specifically, embodiments of the present invention relate to the reconfiguration of interrelationships between components of virtual computing networks (e.g., a grid computing network, a local area network (LAN), a cloud computing network, etc.).

BACKGROUND

Generating an understanding of interactions between components of virtual computing networks as the components relate to physical systems and virtual machines may be a complex matter. Generally, network routing tables and data may reside on networking devices, and information regarding virtual machines may reside inside a virtualization engine. Challenges may exist, however, in that this information may be stored in disparate locations and may not be easily correlated. In addition, both switches and servers may utilize virtualized resources. When a physical failure occurs, it may be difficult to correlate the virtual resources in both the servers and the switches with physical resources to determine an appropriate corrective action.

SUMMARY

In general, embodiments of the present invention relate to an approach for reconfiguring interrelationships between components of virtual computing networks (e.g., a grid computing network, a local area network (LAN), a cloud computing network, etc.). In a typical embodiment, a set of information pertaining to a set of components associated with a virtual computing network is received in a computer memory medium or the like. In general, the set of components may comprise a set of servers, a set of ports, a set of switches, a set of virtual machines (VMs), etc. The set of information may describe a set of interrelationships between the set of components. Regardless, based on the set of information, a graphical representation (e.g., hierarchical tree) depicting the set of interrelationships between the set of components is generated. When a failure in the virtual computing network is detected, at least one of the set of interrelationships between the set of components is reconfigured based on the graphical representation and a set of rules to address the failure.

A first aspect of the present invention provides a computer-implemented method for reconfiguring interrelationships between a set of components of a virtual computing network, comprising: receiving, in a computer memory medium, a set of information pertaining to the set of components associated with the virtual computing network, the set of components comprising a set of servers, a set of ports, a set of switches and a set of virtual machines (VMs), and the set of information describing a set of interrelationships between the set of components; generating, based on the set of information, a graphical representation depicting the set of interrelationships between the set of components; detecting a failure in the virtual computing network; and reconfiguring, responsive to the failure, at least one of the set of interrelationships between the set of components based on the graphical representation and a set of rules.

A second aspect of the present invention provides a system for reconfiguring interrelationships between a set of components of a virtual computing network, comprising: a memory medium comprising instructions; a bus coupled to the memory medium; and a processor coupled to the bus that when executing the instructions causes the system to: receive, in a computer memory medium, a set of information pertaining to the set of components associated with the virtual computing network, the set of components comprising a set of servers, a set of ports, a set of switches and a set of virtual machines (VMs), and the set of information describing a set of interrelationships between the set of components; generate, based on the set of information, a graphical representation depicting the set of interrelationships between the set of components; detect a failure in the virtual computing network; and reconfigure, responsive to the failure, at least one of the set of interrelationships between the set of components based on the graphical representation and a set of rules.

A third aspect of the present invention provides a computer program product for reconfiguring interrelationships between a set of components of a virtual computing network, the computer program product comprising a computer readable storage media, and program instructions stored on the computer readable storage media, to: receive, in a computer memory medium, a set of information pertaining to the set of components associated with the virtual computing network, the set of components comprising a set of servers, a set of ports, a set of switches and a set of virtual machines (VMs), and the set of information describing a set of interrelationships between the set of components; generate, based on the set of information, a graphical representation depicting the set of interrelationships between the set of components; detect a failure in the virtual computing network; and reconfigure, responsive to the failure, at least one of the set of interrelationships between the set of components based on a set of rules.

A fourth aspect of the present invention provides a method for deploying a system for reconfiguring interrelationships between a set of components of a virtual computing network, comprising: deploying a computer infrastructure being operable to: receive, in a computer memory medium, a set of information pertaining to the set of components associated with the virtual computing network, the set of components comprising a set of servers, a set of ports, a set of switches and a set of virtual machines (VMs), and the set of information describing a set of interrelationships between the set of components; generate, based on the set of information, a graphical representation depicting the set of interrelationships between the set of components; detect a failure in the virtual computing network; and reconfigure, responsive to the failure, at least one of the set of interrelationships between the set of components based on the graphical representation and a set of rules.

BRIEF DESCRIPTION OF THE DRAWINGS

These and other features of this invention will be more readily understood from the following detailed description of the various aspects of the invention taken in conjunction with the accompanying drawings in which:

FIG. 15 depicts a representation of virtual machines and their consumption of resources within a physical server according to an embodiment of the present invention.

Figure 1:
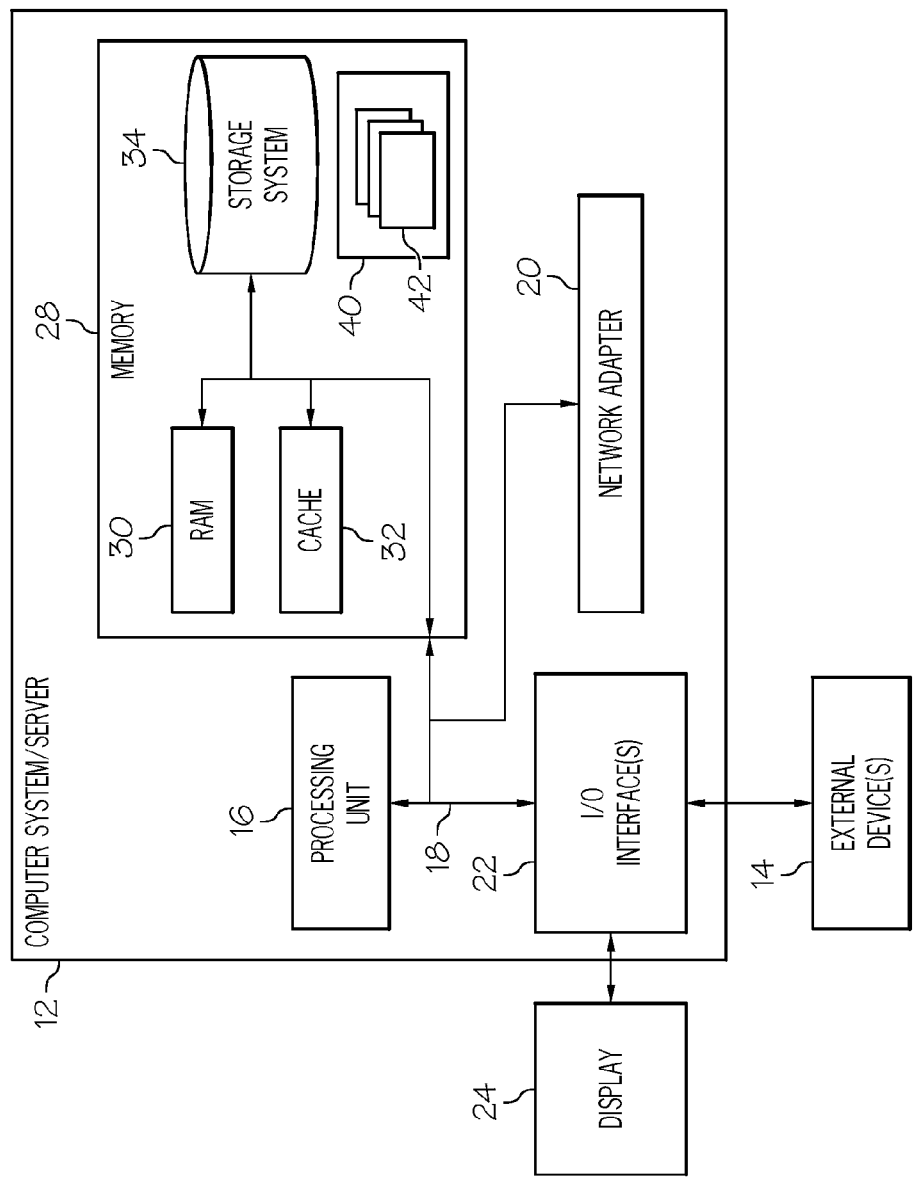
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention relate to an approach for reconfiguring interrelationships between components of virtual computing networks (e.g., a grid computing network, a local area network (LAN), a cloud computing network, etc.). In a typical embodiment, a set of information pertaining to a set of components associated with a virtual computing network is received in a computer memory medium or the like. In general, the set of components may comprise a set of servers, a set of ports, a set of switches, a set of virtual machines (VMs), etc. The set of information may describe a set of interrelationships between the set of components. Regardless, based on the set of information, a graphical representation (e.g., hierarchical tree) depicting the set of interrelationships between the set of components is generated. When a failure in the virtual computing network is detected, at least one of the set of interrelationships between the set of components is reconfigured based on the graphical representation and the set of rules to address the failure.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. In general, program 40 performs the function of the present invention as described herein. For example, program 40 will: receive, in a computer memory medium, a set of information pertaining to the set of components associated with the virtual computing network, the set of components comprising a set of servers, a set of ports, a set of switches and a set of virtual machines (VMs), and the set of information describing a set of interrelationships between the set of components; generate, based on the set of information, a graphical representation depicting the set of interrelationships between the set of components; detect a failure (e.g., failure of a communication link between at least two of the set of components) in the virtual computing network; reconfigure, responsive to the failure, at least one of the set of interrelationships between the set of components based on a set of rules.

Along these lines, the set of information may be obtained from the set of switches, and the set of information may comprise at least one of the following: a set of routing tables, a virtual computing network configuration port mapping, or a Media Address Control (MAC) address to a set of Internet Protocol (IP) tables. Further, the set of information may be further obtained from the set of servers, and the set of information may further comprise at least one of the following: a set of mappings between the set of VMs and the set of switches, a set of mappings between the set of switches and the set of ports, or a set of mappings interbetween the set of ports. Moreover, the virtual computing network may comprise any type of virtual computing network such as a grid computing network, a cloud computing network, a virtual local area network (VLAN), a virtual private network, etc. Further the set of ports may comprise at least one virtual port and at least one physical port.

As will be further shown below, the graphical representation may comprise a hierarchical tree having a set of nodes corresponding to the set of components. The set of rules may comprise an ordered set of criteria for determining which interrelationships between the set of components to reconfigure so that the set of components remains accessible despite the failure.

Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
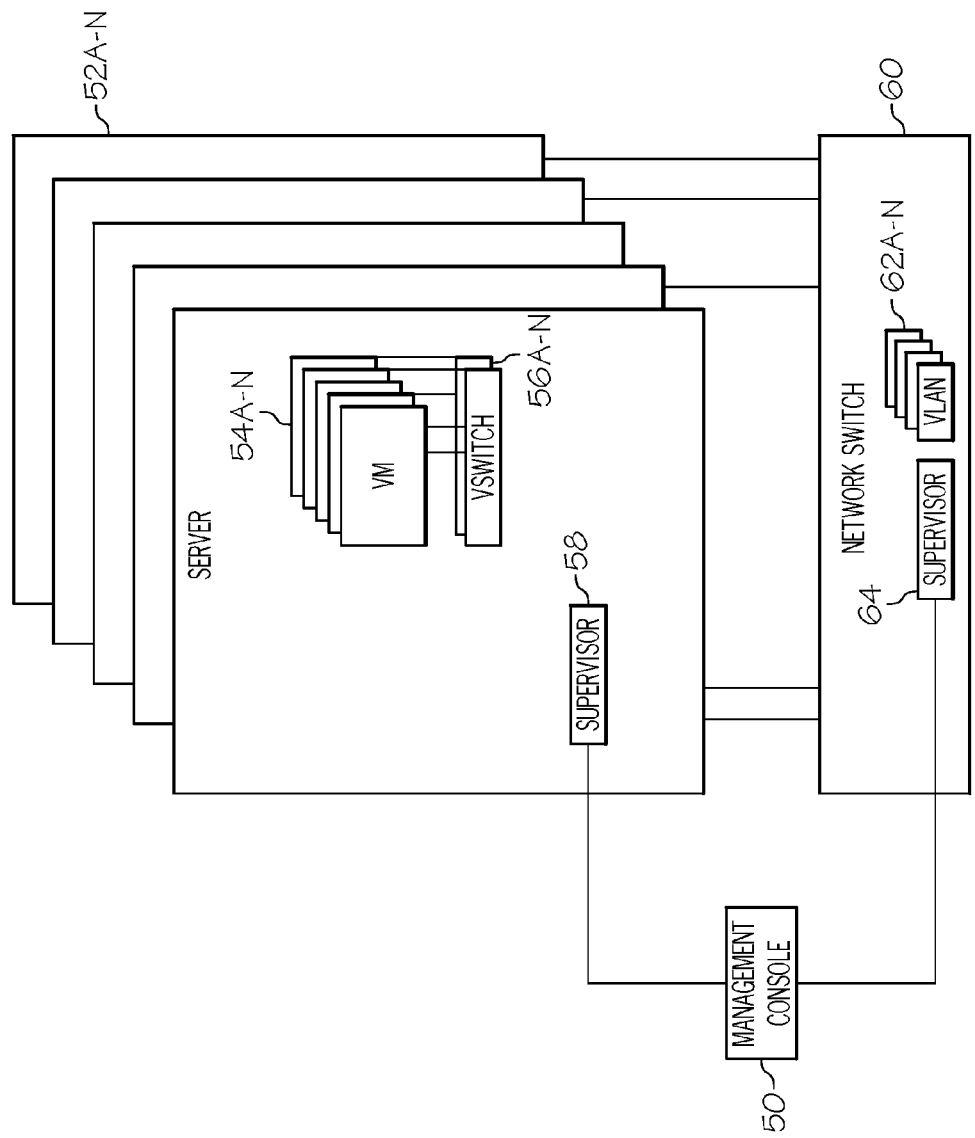
FIG. 2 depicts a system diagram according to an embodiment of the present invention.

Referring now to FIG. 2, a system diagram according to an embodiment of the present invention is shown. As depicted, FIG. 2 comprises management console 50 communicating with a set of servers 52A-N having a set of virtual machines (VMs) 54A-N, a set of virtual switches 56A-N, and a supervisor 58. Management console 50 further communicates with a network switch 60 that itself comprises a set of virtual local area networks (VLANS) 62A-N and a supervisor 60. In general, management console 50 may comprise program/utility 40 as shown in FIG. 1. That is, management console 50 may interact with supervisors 58 and 64 to implement the teachings recited herein.

In general, in a typical embodiment: the connections between the VMs 54A-N and the virtual switches 56A-N may be virtual; the connections between the servers 52A-N and the network switch 60 may be physical; the VLANs 62A-N created by the network switch 60 may be virtual; and the supervisors 58 and 64A-N represent the management/administrative functions within the respective equipment.

As will be further discussed below, management console 50 will configure the linking of disparate data sources (e.g., server VLAN data, switch VLAN data, VMs, virtual switches, etc.) into an interconnected information set, rendering the information into a hierarchical tree (e.g., human readable representation) that is used to identify alternate logical and physical paths between systems to mitigate communications path failures. Then a process to use the interconnection information set to reconfigure the infrastructure based on pre-defined business rules in the presence of a failure may be provided. In one example, the business rule is reconfigured based on lowest cost, and/or fastest links, and/or minimum reliability of connections.

Among other things, embodiments of the present invention obtain information from switch and server configuration tables, and then by application of algorithms set forth below, derives key relationships within the data. The embodiments set forth therein then render the information in a format that can be understood and acted upon. Upon a hardware failure, the invention determines a "fix" to the failure, based on predefined business rules and then reconfigures the infrastructure.

A. Generation of a Hierarchical Tree Representation

Figure 3:
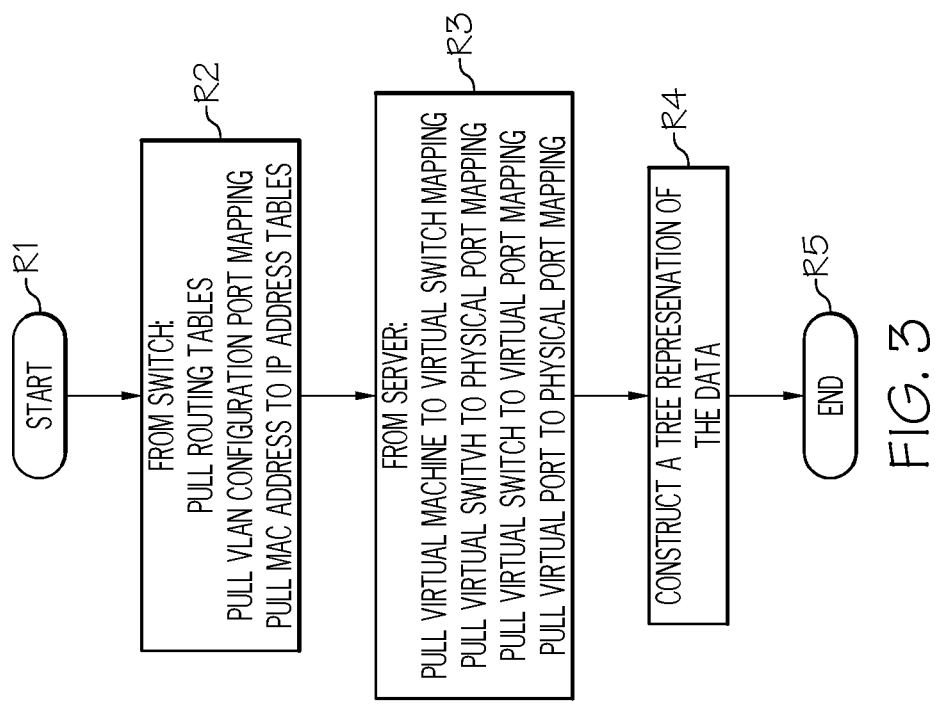
FIG. 3 depicts a first flow diagram according to an embodiment of the present invention.

In a typical embodiment, management console 50 will obtain various pieces of information and construct a tree representation of the data. FIG. 3 depicts a method flow diagram of this process. The process is started in step R1. In step R2, the following information is obtained from network switch 60 (e.g., by management console 50):
  routing Tables (IP subnet to physical switch port relationship)
  VLAN Configuration (VLAN ID to Switch Physical Port relationship)
  MAC Configuration (switch port's MAC address to IP subnet associated to the port)
In step R3, management console 50 will also obtain from servers 52A-N, the following information:
  virtual server machine to virtual server switch relationship 16
  virtual server switch to server physical port relationship
  virtual server switch to virtual server port relationship
  virtual server port to physical server port mapping
In step R4, a hierarchical tree representation depicting the interrelationships between the network components is generated before the process is ended in step R5.

The following is some illustrative pseudo code for this process: Method step details for Block: Construct a tree representation of the data.
  Loop: For each VLAN in switch configuration table,
    make a 1st layer (VLAN) node in the tree.
  Loop: For each physical switch port,
    make a 2nd layer (physical switch port) node and link node to the 1st layer (VLAN) node.
  Loop: For each physical port associated with the server,
    make a 3rd layer (Vswitch) node and link node to the 2nd layer (physical switch port) node.
  Loop: For each Vswitch associated with the server,
    make a 4th layer (virtual machine) node and link node to the 3rd layer (Vswitch) node.

Figure 4:
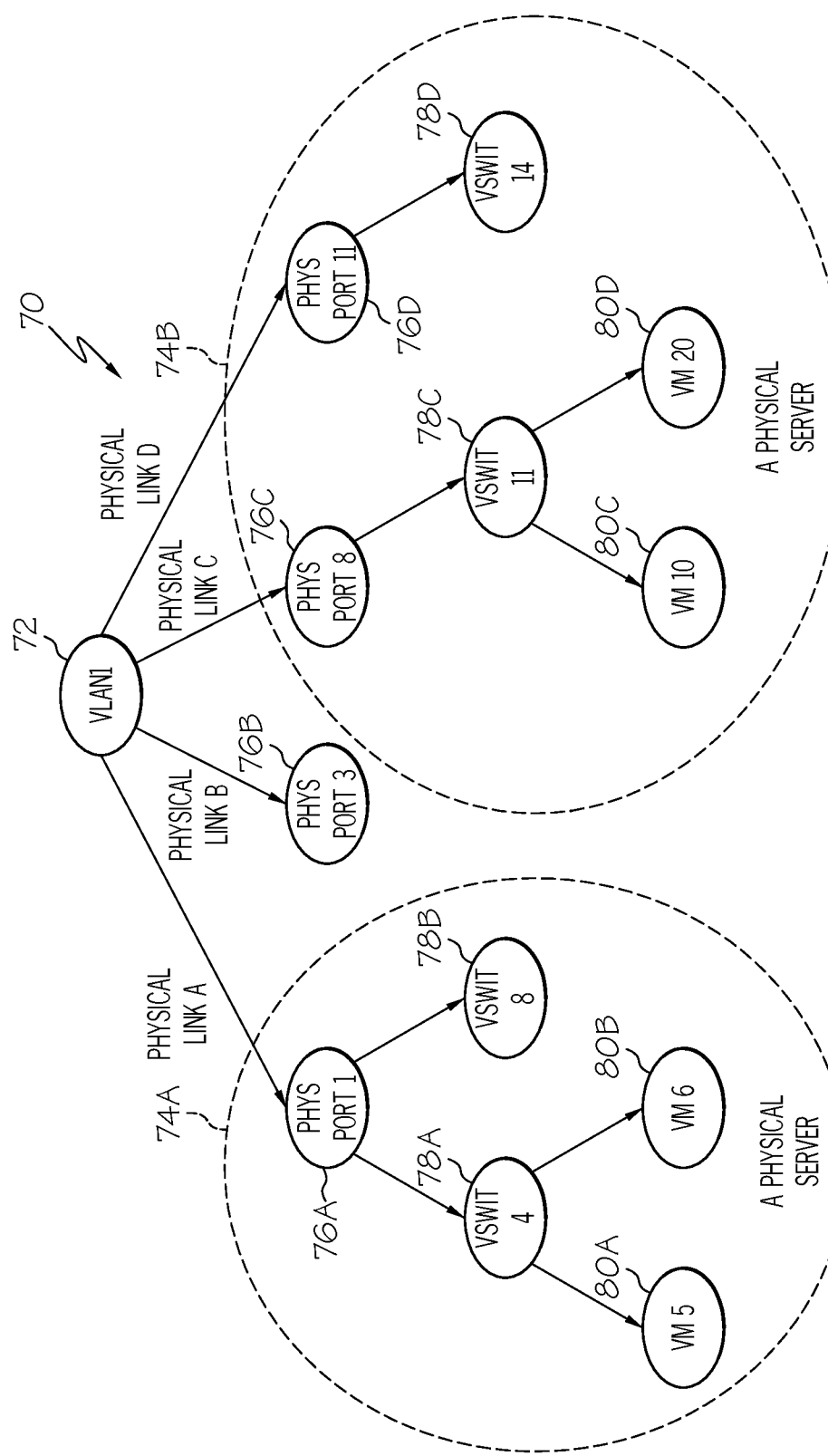
FIG. 4 depicts a hierarchical tree according to an embodiment of the present invention.

The result of the above-described process is a tree graph linking the VMs to their associated VLANs overlaid with their physical attributes. An example of a tree graph so generated is illustrated in FIG. 4. It is noted in advance that FIG. 4 and the Figures that follow depict a possible tree-like representation and that other alternatives can be generated hereunder. In any event, as depicted, representation 70 comprises a tree-like diagram depicting the interrelationships/links between multiple components. As shown, at the root of tree 72 is VLAN1, which interacts with servers 74A-B by being linked/is coupled to physical ports 76A-D. Physical ports 76A-D can be coupled/linked to virtual switches 78A-D, which themselves can be coupled/linked to VMs 80A-D. In the event of a failure of any of the linkages shown in FIG. 4, representation 70 provides a snapshot view of possible reconfiguration alternatives.

B. Reconfiguration Alternatives

Figure 5:
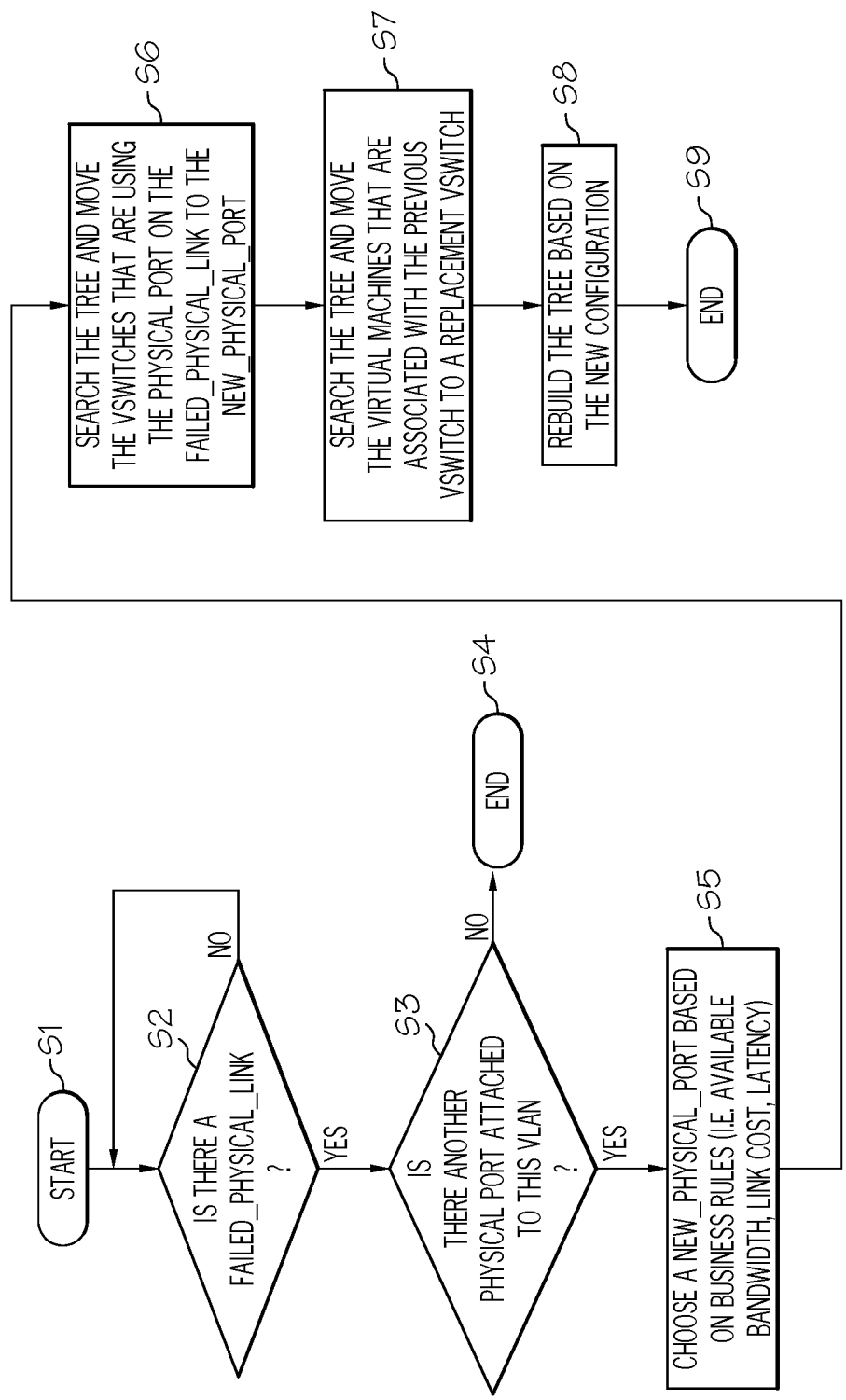
FIG. 5 depicts another method flow diagram according to an embodiment of the present invention.

This section will discuss possible ways a networked computing environment (or the interrelationship between the components thereof) can be reconfigured in the event of a failure. Specifically, the flow chart of FIG. 5 illustrates the reconfiguration method steps. In this flow chart the following terms are used:
  Failed_Physical_Links—a physical layer network connection that is down or not functioning and thus preventing data flow.
  New_Physical_Port—a physical network interface that is connected to the VLAN and available for use by a Vswitch.
  Previous Vswitch—a Vswitch that has VMs that are attached.
  Replacement Vswitch—A newly created or already created Vswitch that can be utilized by VMs.
It is understood in advance that a "connection failure" is not limited to a physical failure (e.g., a physical wire). Connection failures may be the result of a logical failure (e.g., a mis-configuration, a software error, a database error, etc.). The embodiments of the present invention are intended to be applicable to all types of failures, not just physical.

The process starts in step S1, and in step S2, it is determined whether there is a Failed_Physical_Links. If not, the process returns. If so, the process proceeds to step S3 where it is determined whether there is another physical port attached to the VLAN. If not, the process ends in step S4. If so, a New_Physical_Port is chosen in step S5 based on a set of business rules. In performing step S5, the determination of which link within the interconnection information to be set is based on the infrastructure administrator defining an ordered set of criteria with the selection based on a best choice. For example, if link costs were to be minimized, each link would have an associated cost, and the method would systematically search for the lowest cost link among the possible interconnection. Searching for the lowest cost link among a set of links is known and declared enabling art. For example, if remaining link capacity were used, such that each VM would be allocated to the next most available link, each link would have an associated spare capacity measure, and the method would systematically search for the largest spare compactly. It would then, in turn, assign the VMs to the links.

Regardless, in step S6, the tree representation is searched, and the virtual switches that are using the physical port on the Failed_Physical_Link are moved to the New_Physical_Port. In step S7, the tree representation is searched and any VMs that are associated with the previous virtual switch are moved to a replacement virtual switch. In step S8, the tree representation is then rebuilt based on the new configuration before the process is ended in step S9.

Figure 6:
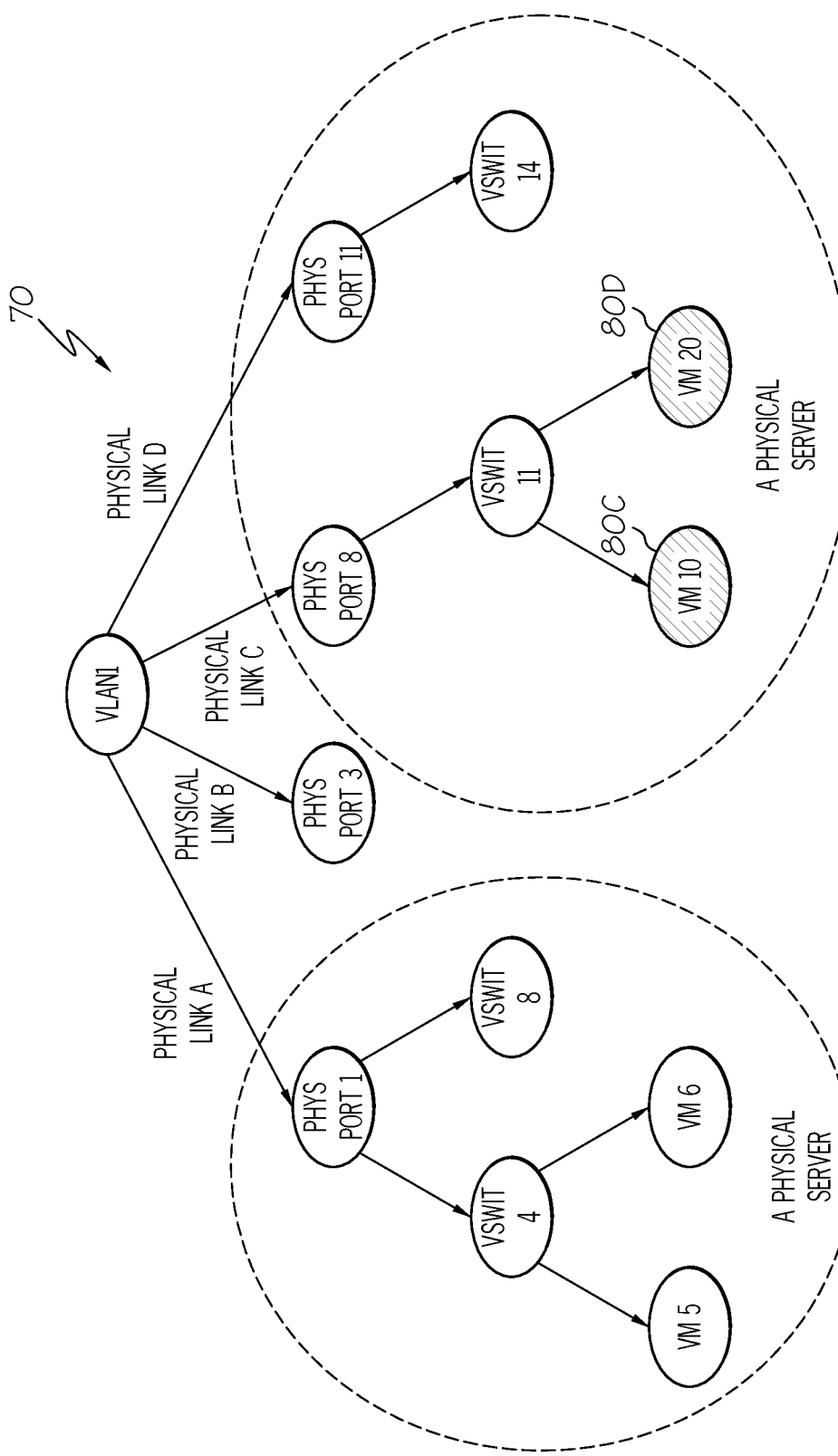
FIG. 6 depicts another hierarchical tree according to an embodiment of the present invention.
Figure 7:
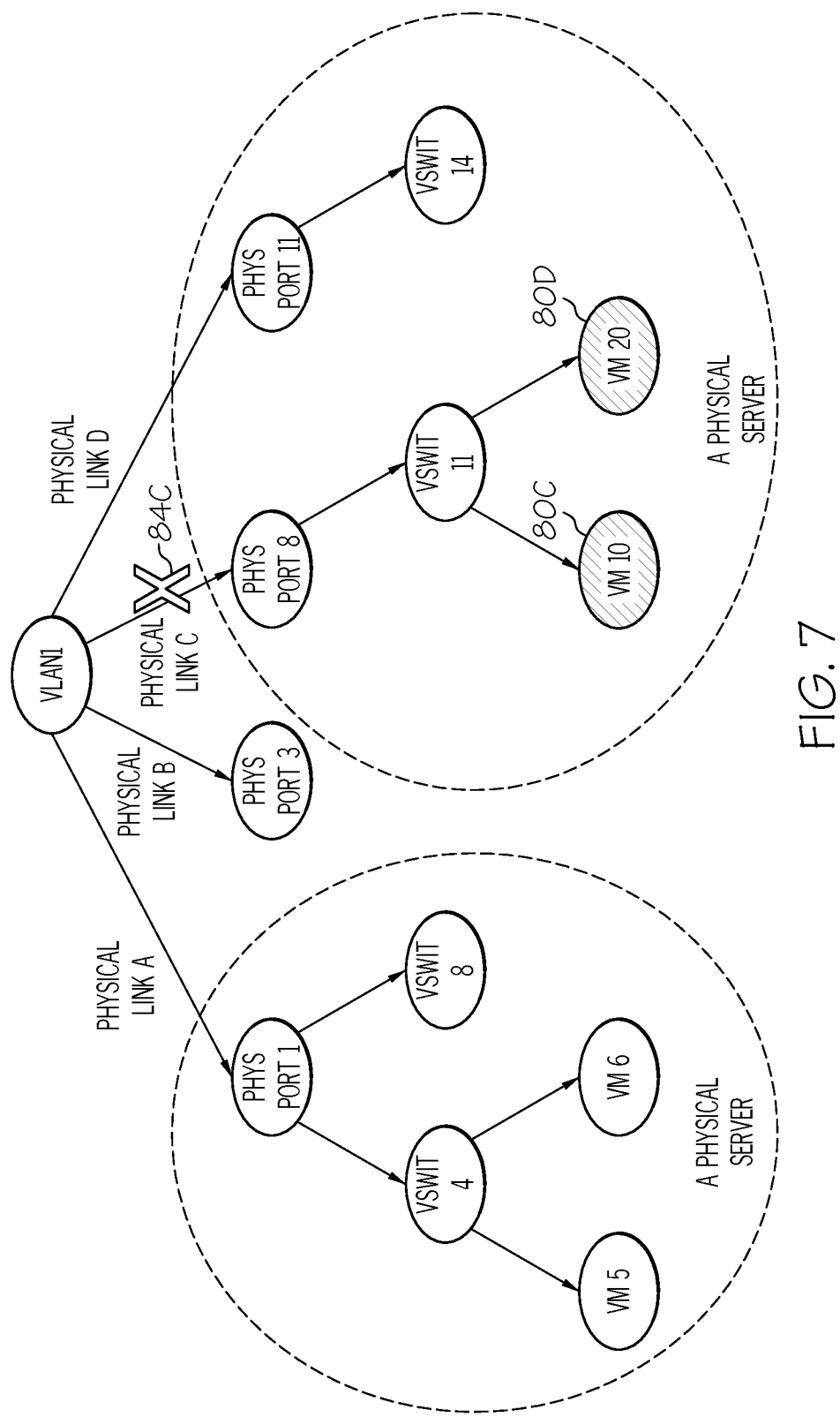
FIG. 7 depicts another hierarchical tree according to an embodiment of the present invention.
Figure 8:
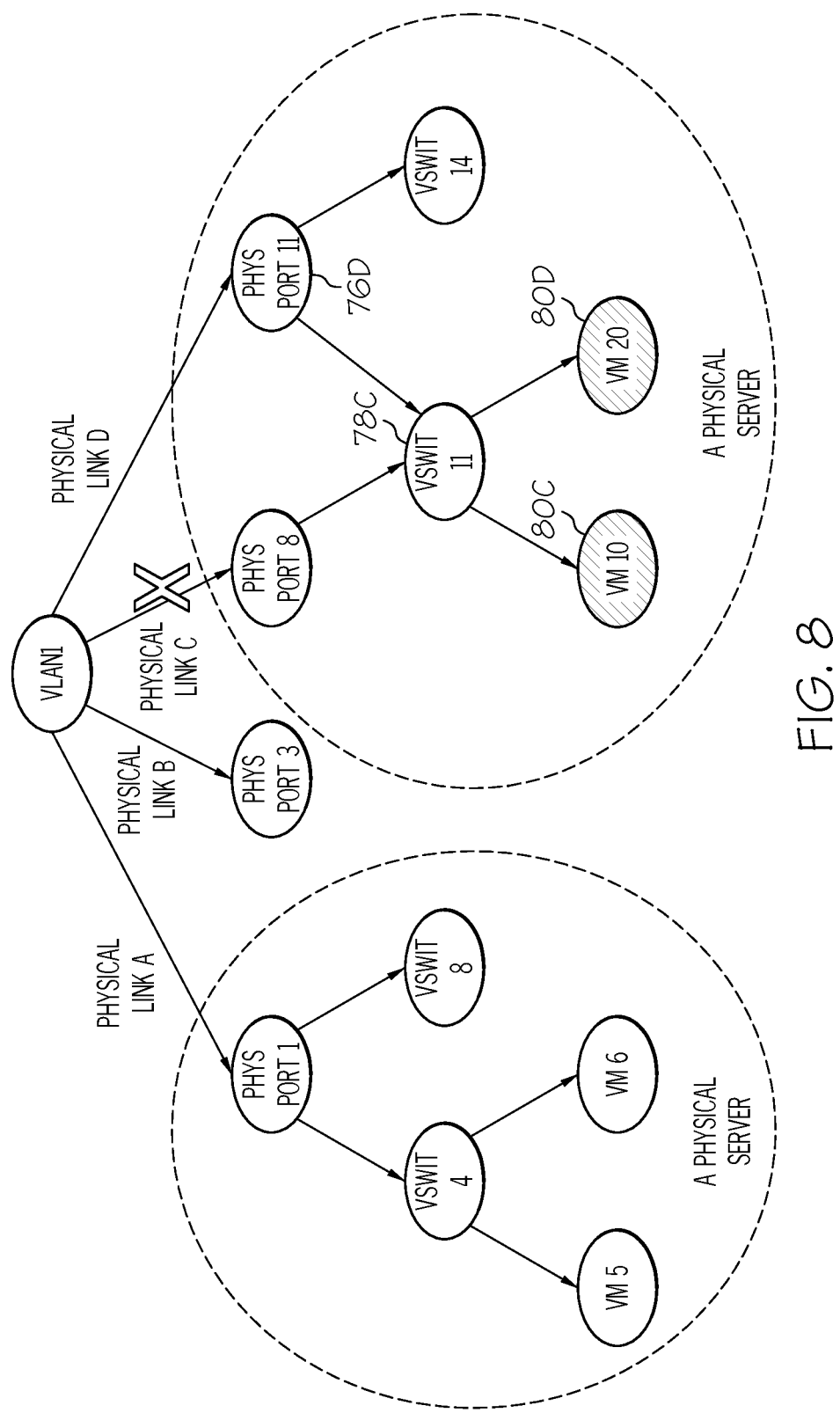
FIG. 8 depicts another hierarchical tree according to an embodiment of the present invention.
Figure 9:
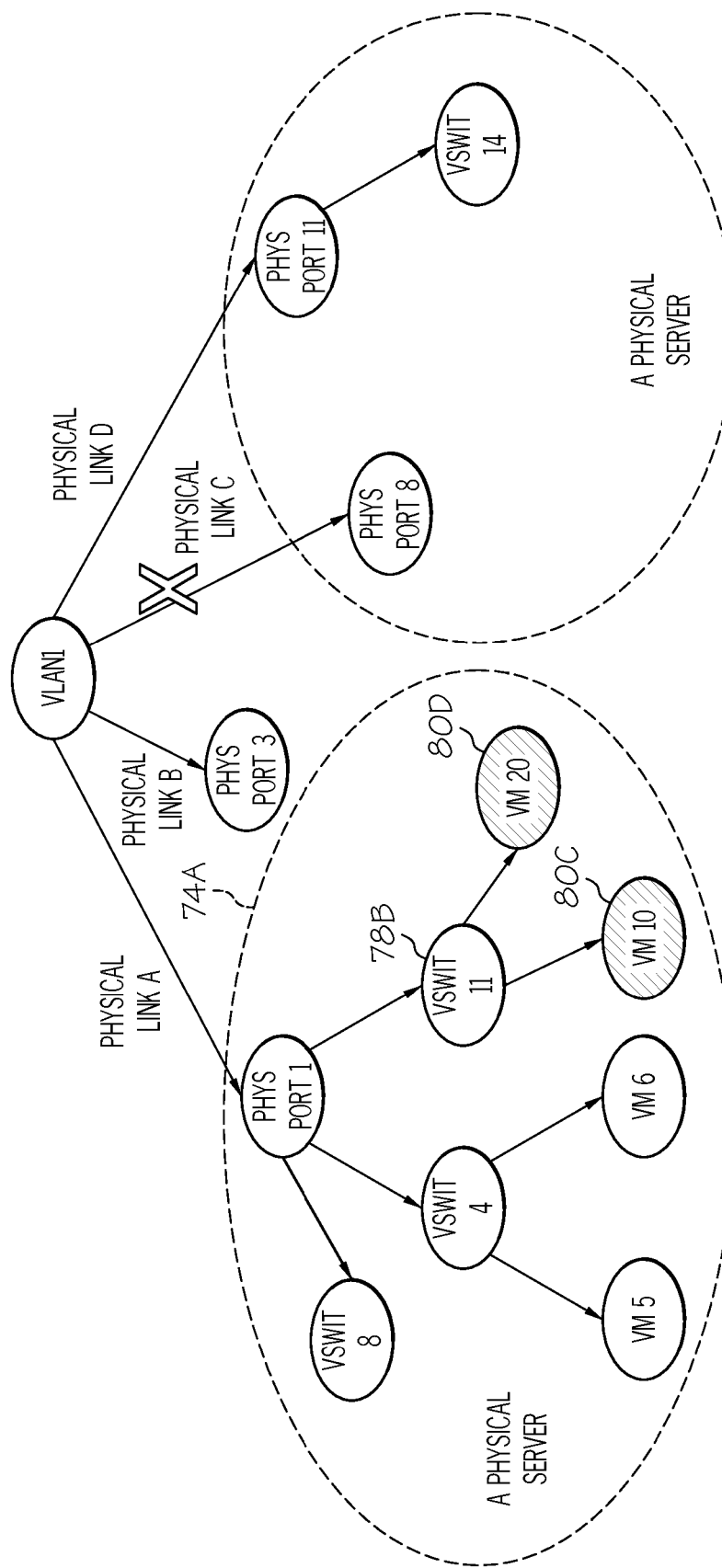
FIG. 9 depicts another hierarchical tree according to an embodiment of the present invention.
Figure 10:
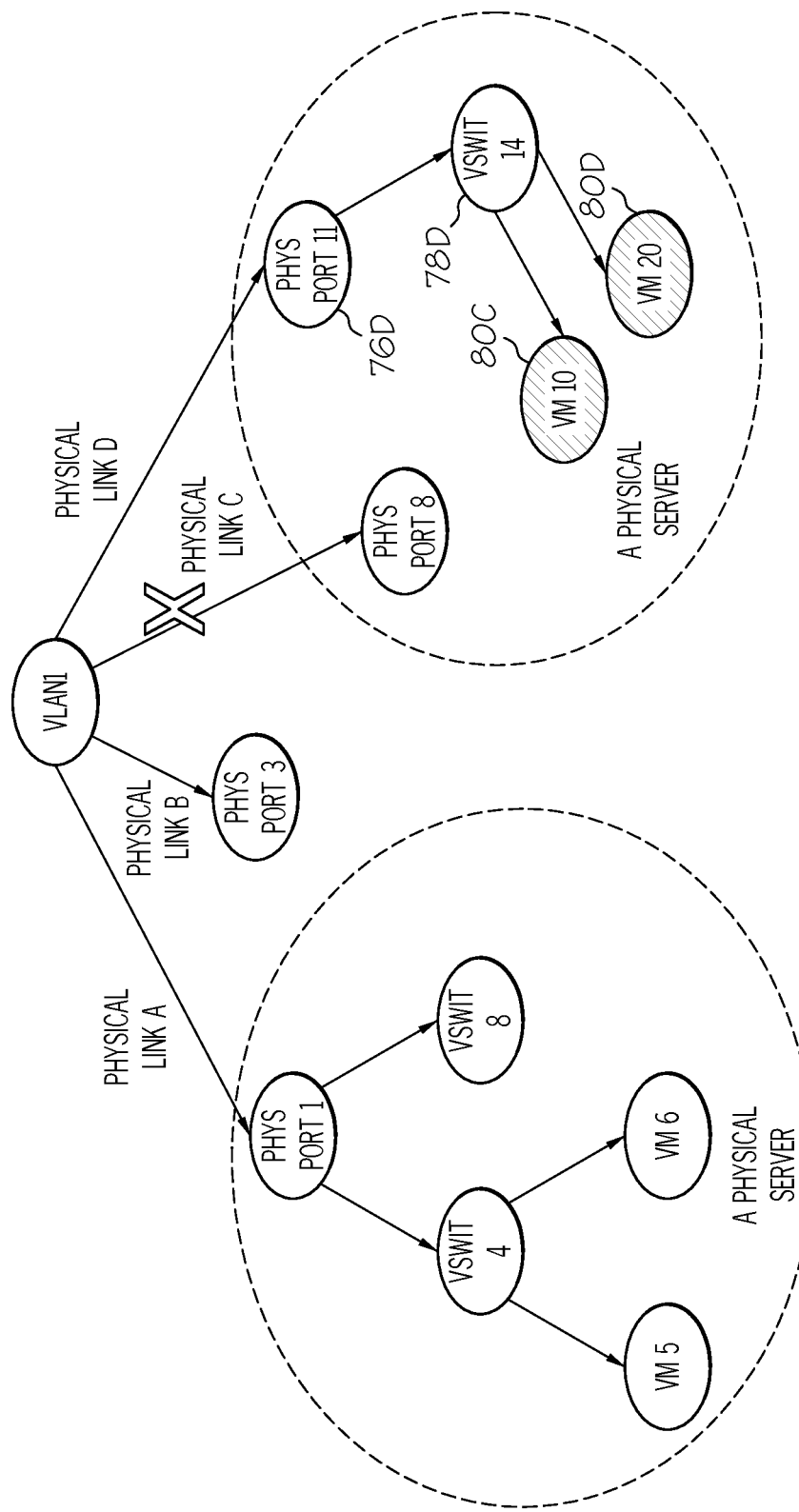
FIG. 10 depicts another hierarchical tree according to an embodiment of the present invention.
Figure 11:
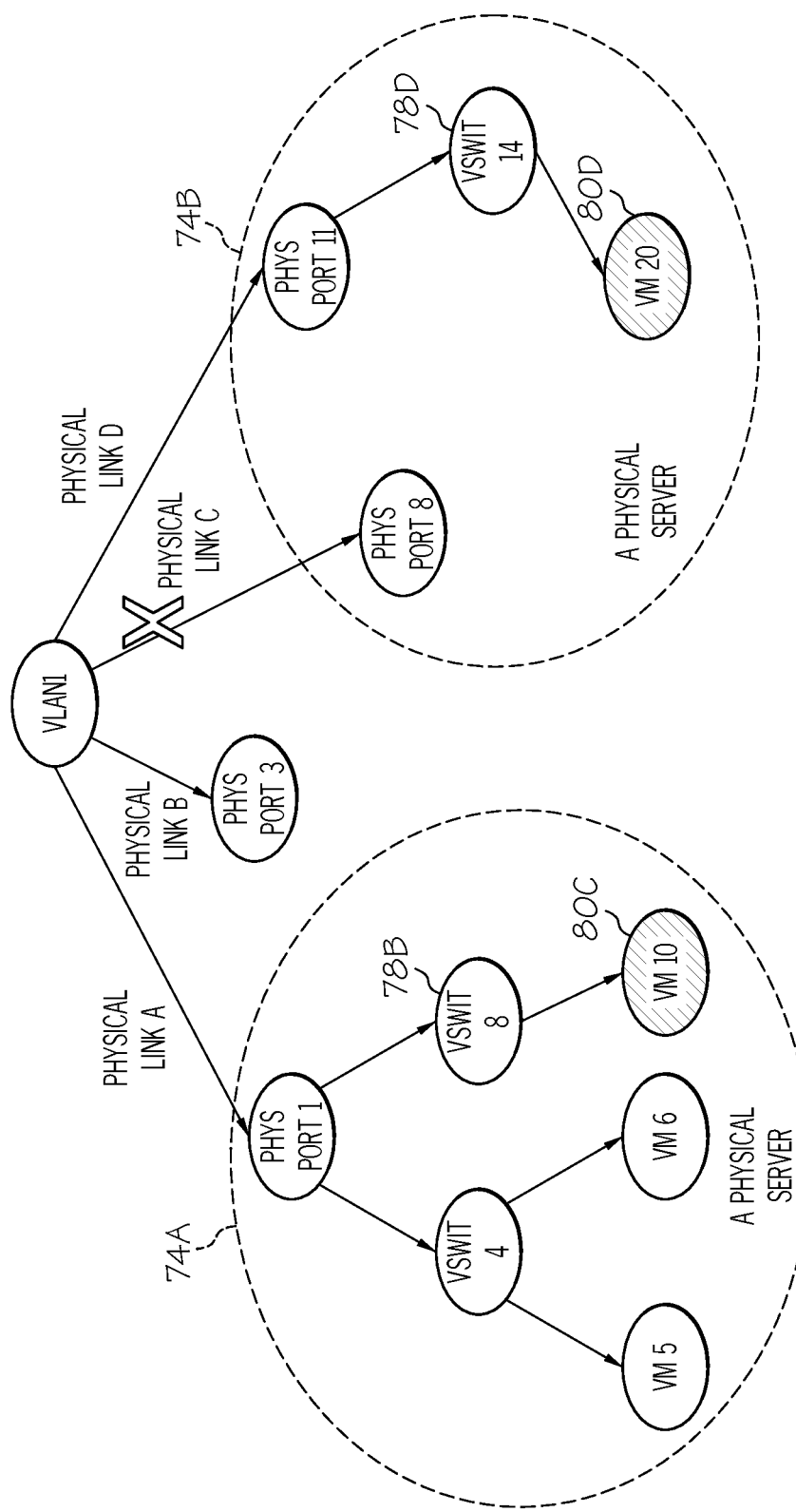
FIG. 11 depicts another hierarchical tree according to an embodiment of the present invention.

Referring now to FIGS. 6-11, the concepts presented hereinabove will be shown and described in greater detail. FIG. 6 shows tree representation 70 where VMs 80C-D are no longer accessible. As depicted, in FIG. 7, this can occur due to a failure of physical link 84C, which would prevent accessibility to VMs 80C-D. As shown in FIG. 8, VMs 80C-D can be kept in service by reconfiguring virtual switch 78C to connect to physical port 76D. FIG. 9 shows another approach whereby VMs 80C-D are reconfigured to couple to virtual switch 78B in server 74A. FIG. 10 shows yet another approach whereby VMs 80C-D are reconfigured to couple to virtual switch 78D while virtual switch 78C (not shown) was removed from service. FIG. 11 shows a hybrid approach whereby VM 80C is reconfigured to couple to virtual switch 78B of server 74A, while VM 80D is reconfigured to couple to virtual switch 78D of server 74B. In any of the cases shown in FIGS. 8-11, both VMs 80C-D affected by the failure were able to be kept in service due to a graphical understanding of the overall system and the interrelationships between the components made possible hereunder.

It is understood that reconfiguration decisions in moving to a new server can be based on available link capacity, server capacity, memory capacity, CPU utilization, power usage, cost, proximity to related VMs, and physical separation requirement for different VMs. It is understood that additional considerations may be used to determine the reconfiguration decision.

C. Additional Embodiments

With the information obtained in building the tree representation, augmented by ancillary information obtained by existing query methods, the following representations of the information can be rendered. Using these representations, additional functions and services can be achieved.

Figure 12:
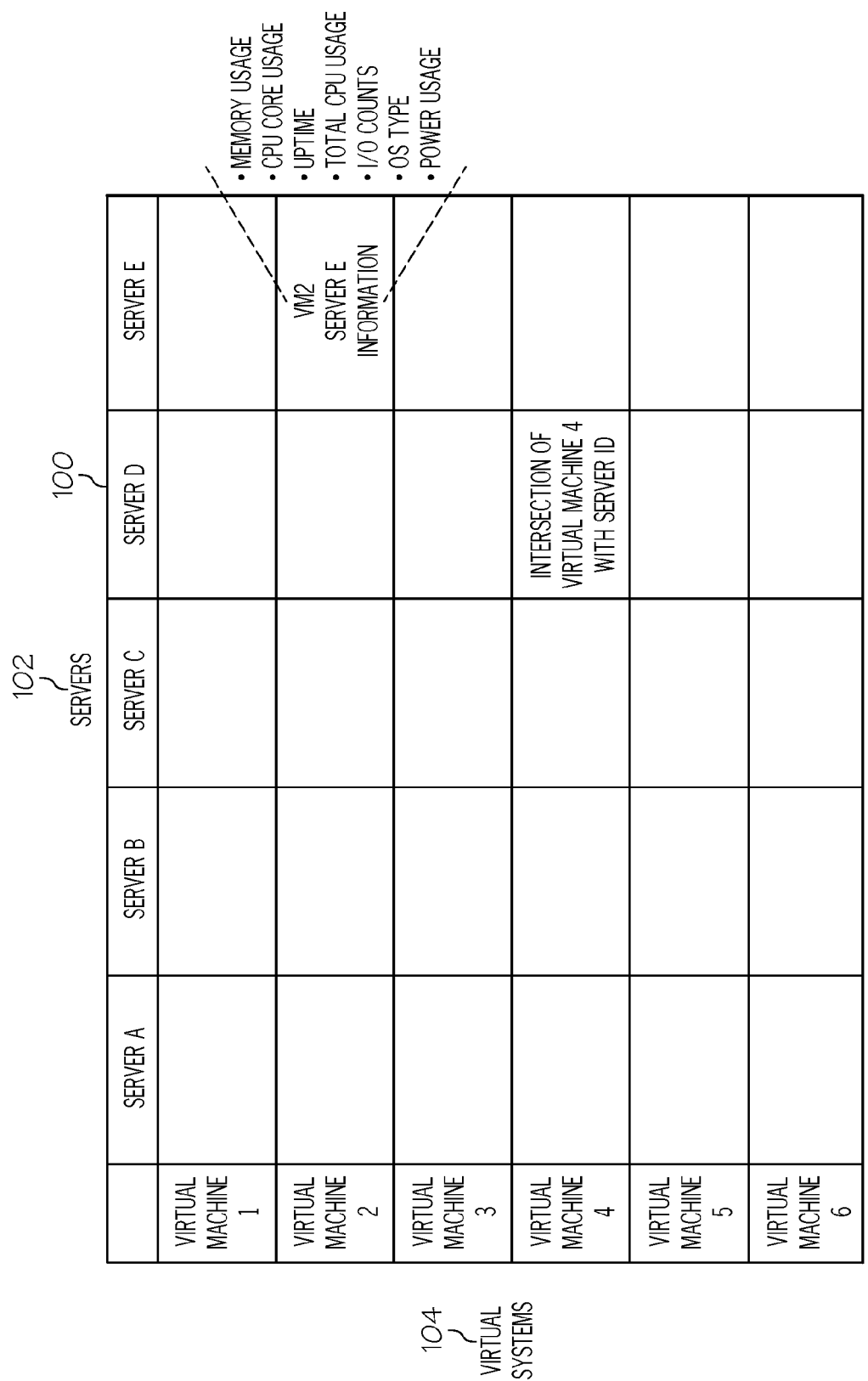
FIG. 12 depicts a representation of servers and virtual machines according to an embodiment of the present invention.

Referring now to FIG. 12, a representation 100 of servers 102 and virtual machines 104 are instantiated on the servers along with their attributes (e.g., memory usage, core usage, uptime, total CPU time, I/O counts, operating system (OS) type, power type, etc.). Representation 100 enables the capturing key of server data points to allow decisions to be made on moving virtual machines to another server based on the attribute gathered.

Figure 13:
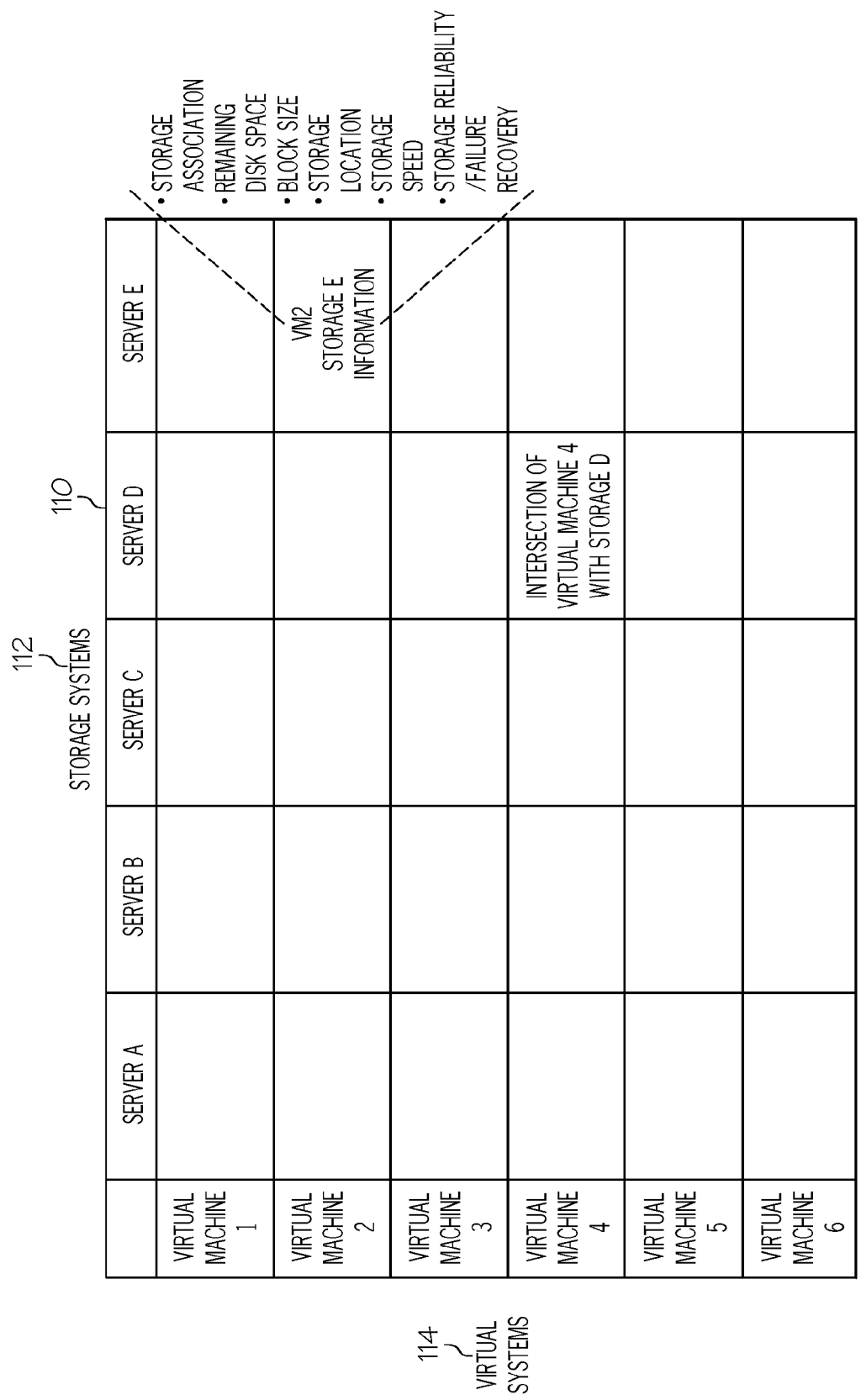
FIG. 13 depicts a representation of virtual machines and associated storage systems according to an embodiment of the present invention.

Referring now to FIG. 13, a representation 110 of storage systems 112 and their associated virtual systems 114 along with their attributes (e.g., storage association, remaining disk space, block size, storage location, storage speed, storage reliability/failure recovery, etc.) is shown. Representation 100 enables the capturing of key data storage points associated with each virtual machine it enables to allow decisions to be made on tuning storage parameters and allocations to improve the overall operating environment.

Figure 14:
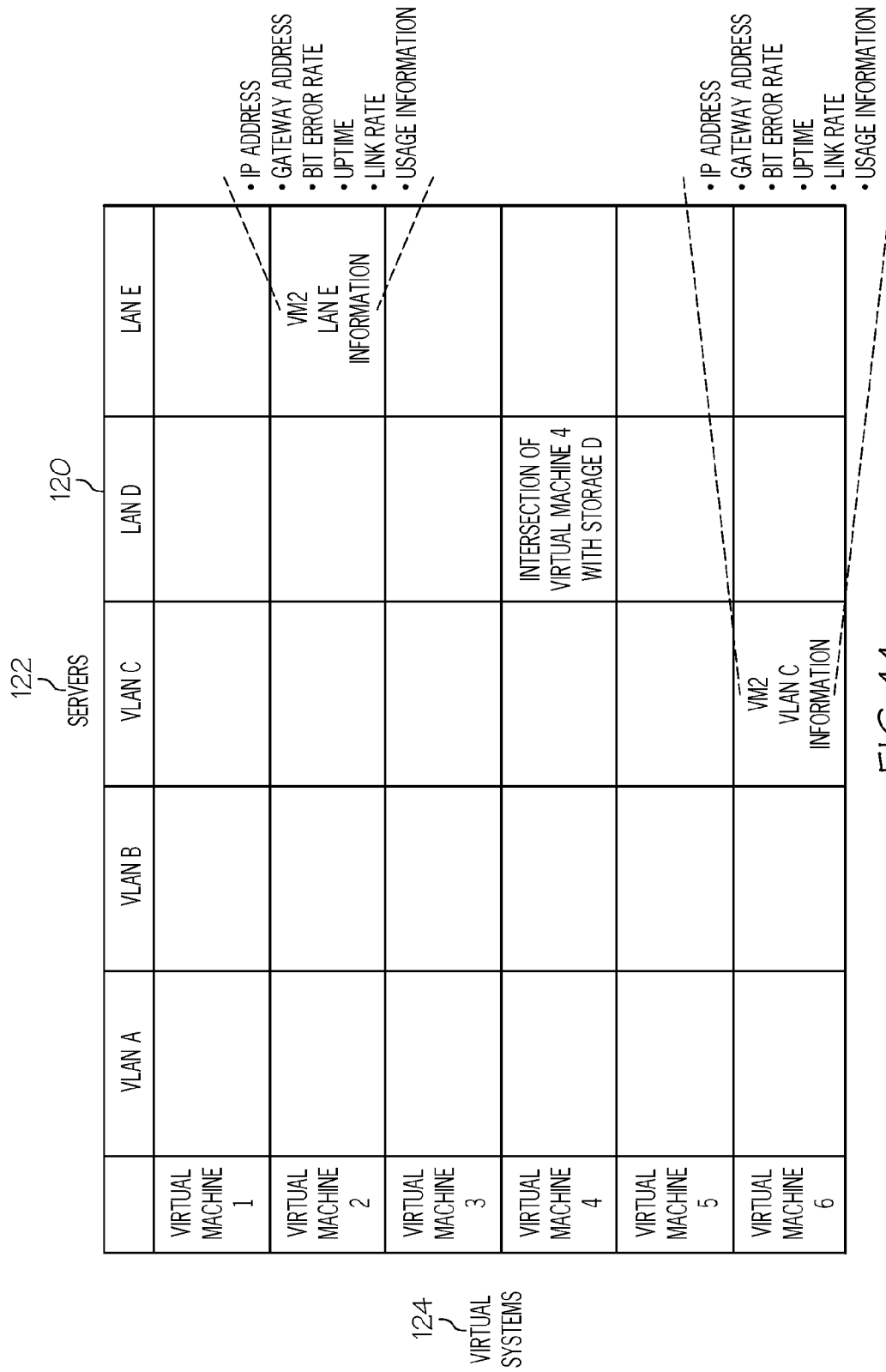
FIG. 14 depicts a representation of virtual machines and their virtual network according to an embodiment of the present invention.

Referring now to FIG. 14, a representation 120 of virtual networks 122 and their associated virtual machines 124 along with their attributes (e.g., IP address, gateway error, bit error rate uptime, link rate, usage information, etc.) is shown. Representation 120 enables the capturing key virtual network data points to allow operational decisions to be made on balancing network load and routing around highly utilized environments, and enables reconfiguration decisions to be proactively made.

Referring now to FIG. 15, a representation 130 of virtual machines 134 and their consumption of real resource within the physical server ("i") 132, along with their attributes (e.g., health indicator of the physical resource for memory, disk space, CPU availability, network bandwidth, etc.) is shown. Representation 130 enables the capturing of key virtual machine data points as these data points relate to real physical server to allow operational decisions to be made on balancing load and routing around highly utilized environments, and enables reconfiguration decisions to be proactively made.

Figure 16:
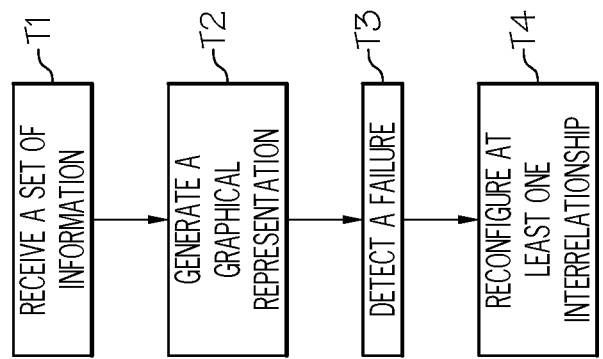
FIG. 16 depicts another method flow diagram according to an embodiment of the present invention.

Referring now to FIG. 16, a method flow diagram according to an embodiment of the present invention is shown (e.g., as enabled by engine 50 of FIG. 2). As depicted, in step T1, a set of information pertaining to a set of components associated with a virtual computing network is received. As indicated above, the set of components may comprise a set of servers, a set of ports, a set of switches and a set of virtual machines (VMs), and the set of information describing a set of interrelationships between the set of components. In step T2, a graphical representation depicting the set of interrelationships between the set of components is generated based on the set of information. In step T3, a failure in the virtual computing network is detected. In step T4, responsive to the failure, at least one of the set of interrelationships between the set of components is reconfigured based on a set of rules.

While shown and described herein as an interrelationship reconfiguration solution, it is understood that the invention further provides various alternative embodiments. For example, in one embodiment, the invention provides a computer-readable/usable medium that includes computer program code to enable a computer infrastructure to provide interrelationship reconfiguration functionality as discussed herein. To this extent, the computer-readable/usable medium includes program code that implements each of the various processes of the invention. It is understood that the terms computer-readable medium or computer-usable medium comprise one or more of any type of physical embodiment of the program code. In particular, the computer-readable/usable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide interrelationship reconfiguration functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for interrelationship reconfiguration. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for reconfiguring interrelationships between a set of components of a virtual computing network, comprising:
receiving, in a computer memory medium, a set of information pertaining to an entirety of the set of components associated with the virtual computing network, the set of components comprising a set of physical servers, a set of ports, a set of virtual switches and a set of virtual machines (VMs), and the set of information describing a set of interrelationships between the set of components;
generating, based on the set of information, a graphical representation depicting a visual representation of each of the set of components and a visual link illustrating each interrelationship of the set of interrelationships between individual components of the set of components, the graphical representation comprising a hierarchical tree comprising a set of nodes, each node of the set of nodes in the hierarchical tree corresponding to a component in the set of components, the hierarchical tree being formed by:
making, for each virtual local area network (VLAN) in the virtual computing network, a first layer node in the hierarchical tree;
making, for each of the set of ports in the virtual computing network, a second layer node and a link to a corresponding first layer node;
making, for each of the set of virtual switches in the virtual computing network, a third layer node and a link to a corresponding second layer node; and
making, for each of the set of virtual machines in the virtual computing network, a fourth layer node and a link to a corresponding third layer node;
detecting a failure in the virtual computing network resulting in an inability to access a virtual machine of the set of virtual machines; and
automatically reconfiguring, responsive to the failure, at least one of the set of interrelationships between the set of components based on at least one visual link in the graphical representation and a predetermined set of rules.

2. The computer-implemented method of claim 1, the set of information being obtained from the set of virtual switches, and the set of information comprising at least one of the following: a set of routing tables, a virtual computing network configuration port mapping, or a Media Address Control (MAC) address to a set of Internet Protocol (IP) tables.

3. The computer-implemented method of claim 2, the set of information being further obtained from the set of physical servers, and the set of information further comprising at least one of the following: a set of mappings between the set of VMs and the set of virtual switches, a set of mappings between the set of virtual switches and the set of ports, or a set of mappings interbetween the set of ports.

4. The computer-implemented method of claim 1, the virtual computing network comprising a virtual local area network (VLAN), and the set of ports comprising at least one virtual port and at least one physical port.

5. The computer-implemented method of claim 1, the set of rules comprising an ordered set of criteria for determining which interrelationships between the set of components to reconfigure so that the set of components remains accessible despite the failure.

6. The computer-implemented method of claim 1, the failure comprising a failure of a communication link between at least two of the set of components.

7. A system for reconfiguring interrelationships between a set of components of a virtual computing network, comprising:
a memory medium comprising instructions;
a bus coupled to the memory medium; and
a processor coupled to the bus that when executing the instructions causes the system to:

receive, in a computer memory medium, a set of information pertaining to an entirety of the set of components associated with the virtual computing network, the set of components comprising a set of physical servers, a set of ports, a set of virtual switches and a set of virtual machines (VMs), and the set of information describing a set of interrelationships between the set of components;

generate, based on the set of information, a graphical representation depicting a visual representation of each of the set of components and a visual link illustrating each interrelationship of the set of interrelationships between individual components of the set of components, the graphical representation comprising a hierarchical tree comprising a set of nodes, each node of the set of nodes in the hierarchical tree corresponding to a component in the set of components, the hierarchical tree being formed by:

making, for each virtual local area network (VLAN) in the virtual computing network, a first layer node in the hierarchical tree;

making, for each of the set of ports in the virtual computing network, a second layer node and a link to a corresponding first layer node;

making, for each of the set of virtual switches in the virtual computing network, a third layer node and a link to a corresponding second layer node; and making, for each of the set of virtual machines in the virtual computing network, a fourth layer node and a link to a corresponding third layer node;

detect a failure in the virtual computing network resulting in an inability to access a virtual machine of the set of virtual machines; and automatically reconfigure, responsive to the failure, at least one of the set of interrelationships between the set of components based on at least one visual link in the graphical representation and a predetermined set of rules.

8. The system of claim 7, the set of information being obtained from the set of virtual switches, and the set of information comprising at least one of the following: a set of routing tables, a virtual computing network configuration port mapping, or a Media Address Control (MAC) address to a set of Internet Protocol (IP) tables.

9. The system of claim 8, the set of information being further obtained from the set of virtual servers, and the set of information further comprising at least one of the following: a set of mappings between the set of VMs and the set of virtual switches, a set of mappings between the set of virtual switches and the set of ports, or a set of mappings interbetween the set of ports.

10. The system of claim 9, the virtual computing network comprising a virtual local area network (VLAN), and the set of ports comprising at least one virtual port and at least one physical port.

11. The system of claim 7, the set of rules comprising an ordered set of criteria for determining which interrelationships between the set of components to reconfigure so that the set of components remains accessible despite the failure.

12. The system of claim 7, the failure comprising a failure of a communication link between at least two of the set of components.

13. A computer program product for reconfiguring interrelationships between a set of components of a virtual computing network, the computer program product comprising a computer readable storage device that is not a transitory signal, and program instructions stored on the computer readable storage device, to:

receive, in a computer memory medium, a set of information pertaining to an entirety of the set of components associated with the virtual computing network, the set of components comprising a set of physical servers, a set of ports, a set of virtual switches and a set of virtual machines (VMs), and the set of information describing a set of interrelationships between the set of components;

generate, based on the set of information, a graphical representation depicting a visual representation of each of the set of components and a visual link illustrating each interrelationship of the set of interrelationships between individual components of the set of components, the graphical representation comprising a hierarchical tree comprising a set of nodes, each node of the set of nodes in the hierarchical tree corresponding to a component in the set of components, the hierarchical tree being formed by:

making, for each virtual local area network (VLAN) in the virtual computing network, a first layer node in the hierarchical tree;

making, for each of the set of ports in the virtual computing network, a second layer node and a link to a corresponding first layer node;

making, for each of the set of virtual switches in the virtual computing network, a third layer node and a link to a corresponding second layer node; and making, for each of the set of virtual machines in the virtual computing network, a fourth layer node and a link to a corresponding third layer node;

detect a failure in the virtual computing network resulting in an inability to access a virtual machine of the set of virtual machines; and automatically reconfigure, responsive to the failure, at least one of the set of interrelationships between the set of components based on at least one visual link in the graphical representation and a predetermined set of rules.

14. The computer program product of claim 13, the set of information being obtained from the set of virtual switches, and the set of information comprising at least one of the following: a set of routing tables, a virtual computing network configuration port mapping, or a Media Address Control (MAC) address to a set of Internet Protocol (IP) tables.

15. The computer program product of claim 14, the set of information being further obtained from the set of virtual servers, and the set of information further comprising at least one of the following: a set of mappings between the set of VMs and the set of virtual switches, a set of mappings between the set of virtual switches and the set of ports, or a set of mappings interbetween the set of ports.

16. The computer program product of claim 13, the virtual computing network comprising a virtual local area network (VLAN), and the set of ports comprising at least one virtual port and at least one physical port.

17. The computer program product of claim 13, the set of rules comprising an ordered set of criteria for determining which interrelationships between the set of components to reconfigure so that the set of components remains accessible despite the failure.

18. The computer program product of claim 13, the failure comprising a failure of a communication link between at least two of the set of components.

* * * * *